May 23, 1950      C. S. ASH      2,509,052

VEHICLE WHEEL

Filed Oct. 4, 1945      2 Sheets-Sheet 1

INVENTOR
Charles S. Ash.
BY
Hobart N. Durham
ATTORNEY

May 23, 1950     C. S. ASH     2,509,052
VEHICLE WHEEL
Filed Oct. 4, 1945     2 Sheets-Sheet 2
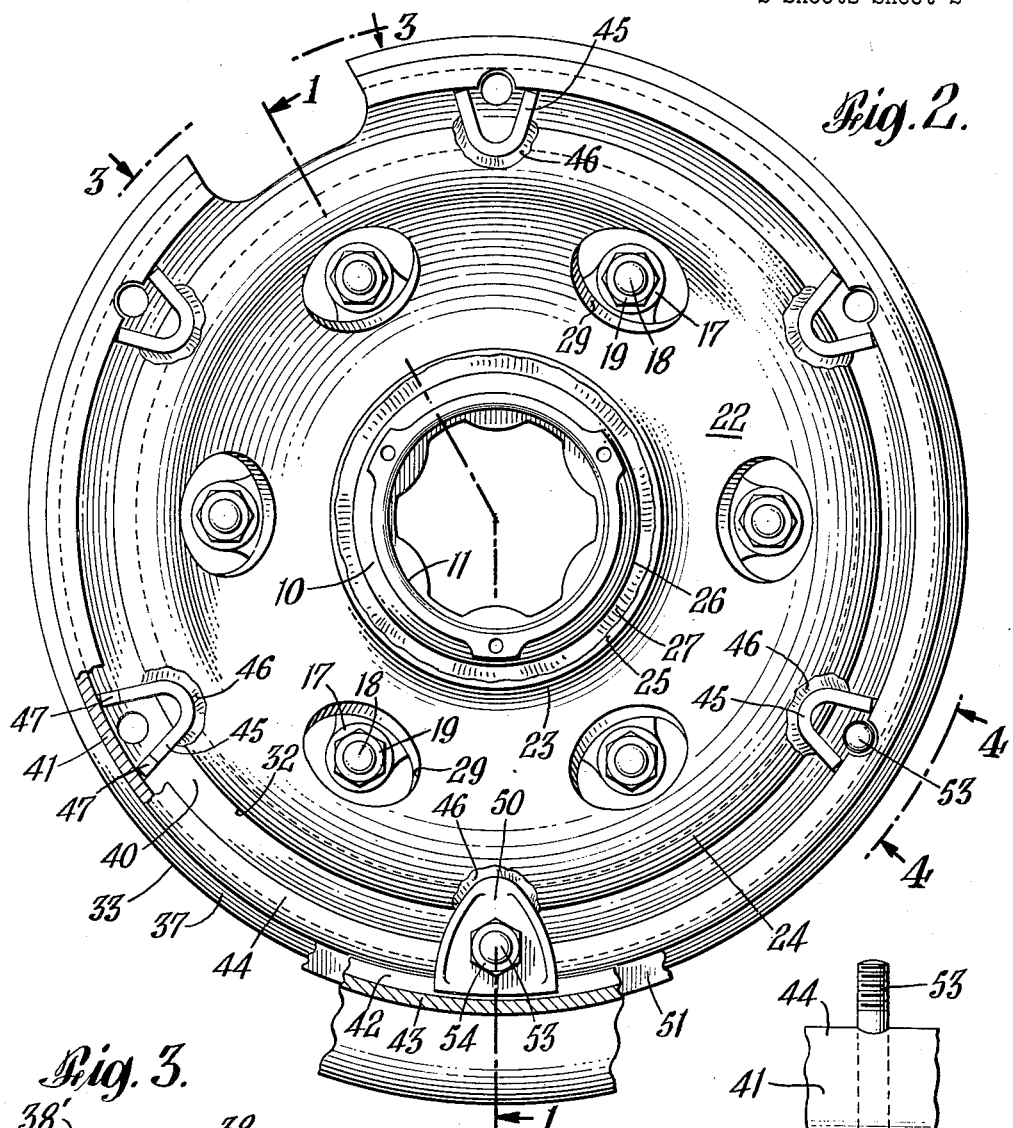
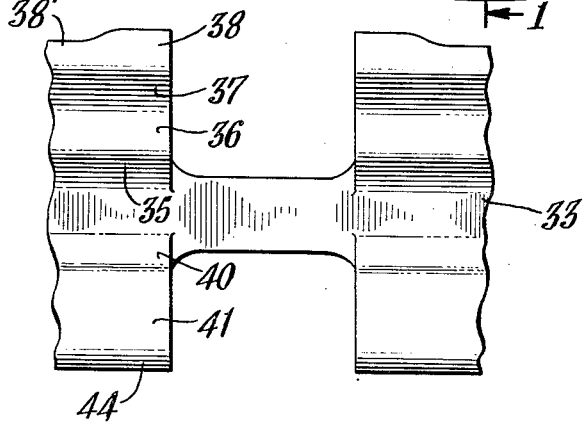
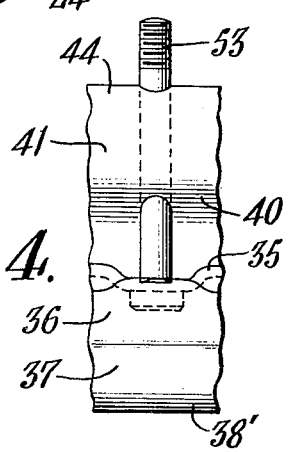
INVENTOR
Charles S. Ash
BY Hobart N. Durham
ATTORNEY Patented May 23, 1950

2,509,052

UNITED STATES PATENT OFFICE 2,509,052

VEHICLE WHEEL

Charles S. Ash, Milford, Mich.

Application October 4, 1945, Serial No. 620,333

5 Claims. (Cl. 301—36)

The present invention relates to vehicle wheels, and more particularly to such wheels on which a pair of tires may be demountably mounted.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

It is an object of the present invention to provide an improved vehicle wheel upon which dual road engaging tires are quickly and efficiently mountable and demountable. Another object of the invention is the provision of a vehicle wheel such as that just mentioned with which the tire carrying rims are demountably associated. The invention further provides a dual tire carrying wheel which is relatively simple and economical in construction but is, at the same time, exceedingly sturdy and capable of heavy duty use. A further object is the provision of a strong dual tire carrying wheel which is of sufficiently flexible construction to receive without injury the many stresses to which a vehicle wheel is subject in use. The invention further provides a relatively simple and efficient pressed web wheel with brake drum associated therewith.

Of the drawings:

Fig. 2 is a side elevation of the vehicle wheel shown in Fig. 1 taken on the outboard side of the wheel looking inwardly;

Fig. 3 is a view taken along line 3—3 of Fig. 2; and

Fig. 4 is a view taken along line 4—4 of Fig. 2.

Figure 1:
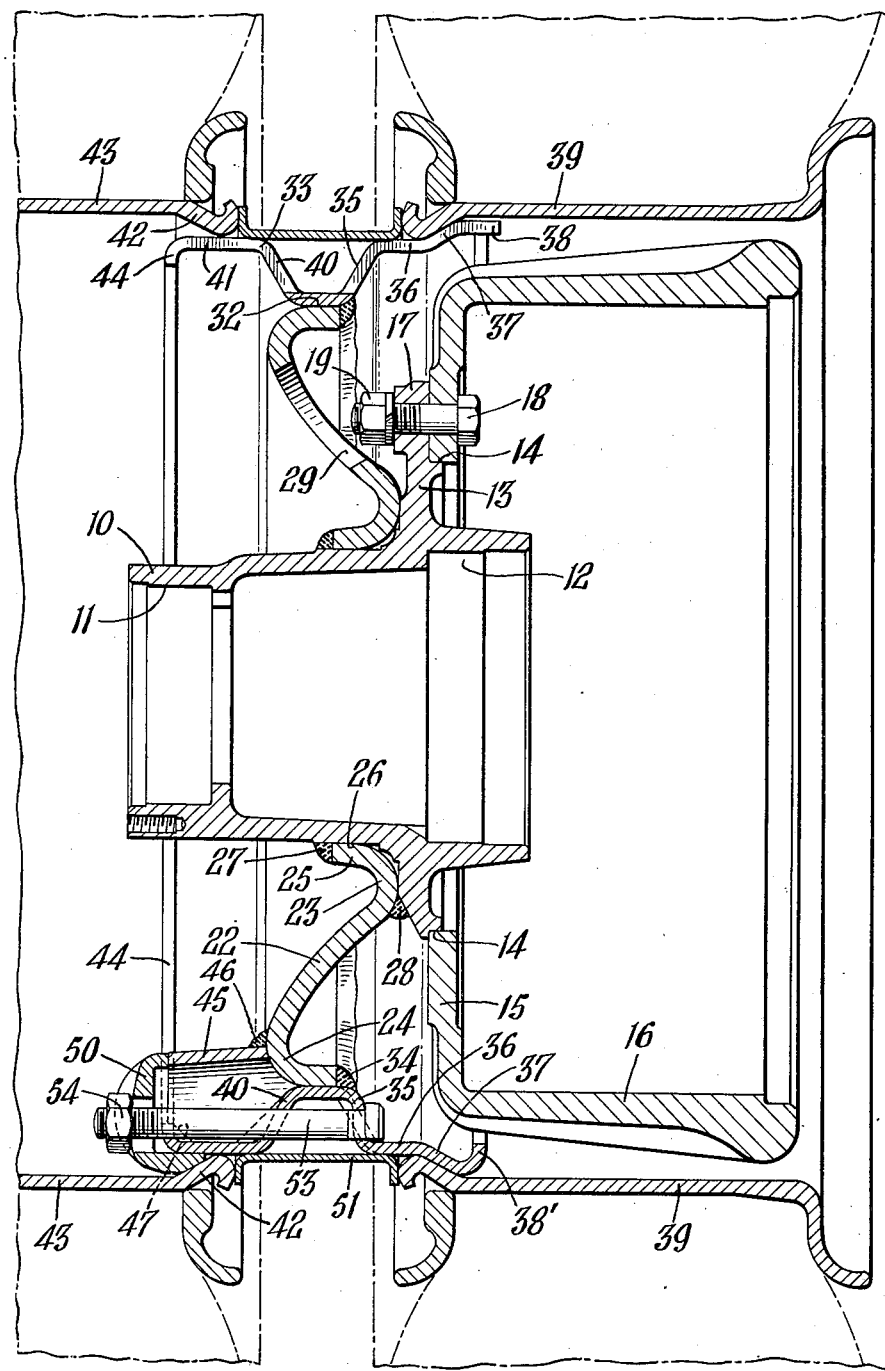
Fig. 1 is a sectional view of a typical and illustrative embodiment of the vehicle wheel of the present invention taken along line 1—1 of Fig. 2.

Referring now in detail to the illustrative embodiment of the invention shown by way of example in the accompanying drawings, and referring particularly to Fig. 1, the vehicle wheel comprises a cast tubular hub 10 which is formed with bearing seats 11 and 12 to receive suitable anti-friction bearings, whereby the wheel may be rotatably mounted upon a vehicle axle. As shown, the hub 10 has integrally formed therewith an outwardly radially extending flange 13 positioned somewhat beyond its center toward the inboard end. The flange 13 is provided with a finished circumferential seat 14 to receive an inner cylindrical surface of the attaching flange 15 which is integral with its cylindrical brake drum 16. A plurality of spaced, outwardly radially extending lugs 17 are integrally formed with hub flange 13, and bolts 18 with cooperating nuts 19 securely and removably mount brake drum 16 on hub 10.

The vehicle wheel further comprises a single web member 22 which may conveniently be pressed in its fabrication to provide an S-shaped structure in cross section having oppositely turned annular portions or ribs 23 and 24, as clearly shown in Fig. 1. The web is thus of strong integral construction, and is preferably preformed and assembled over the outboard end of hub 10. The radially inner cylindrical portion 25 of web 22 seats on a central cylindrical portion 26 of the hub, and the web is securely joined to the hub by a circular weld as indicated at 27. As shown, the structure is further mutually reinforced and joined by the formation of the turned portion or rib 23 of the web, which abuts the radially inner portion of flange 13, and may be welded thereto at a plurality of spots 28. A plurality of apertures 29 are spaced apart about the radially central portion of web 22 at places corresponding with the location of the brake drum mounting nuts 19. Ready access is thus afforded through the web to nuts 19 for mounting or demounting drum 16, and at the same time the construction of the wheel is lightened with slight, if any, sacrifice in strength.

At the outer periphery of web 22 the turned formation of the member provides a substantially cylindrical seat 32 upon which is seated a dual rim mounting band 33 adapted to removably support a pair of pneumatic tire rims. Band 33 is securely welded to web 22 by a circular weld 34 at the inturned outer edge of the web.

The rim mounting band, as illustratively shown, is of drop center formation, and there is provided at the inboard side of the band an integral inclined annular portion 35 which is further turned at its outer edge to form a substantially cylindrical seat 36. The edge of seat 36 merges into an inclined seat 37, which ends in a generally cylindrical edge portion 38 of the rim band, having a radially inwardly turned rim 38' at its innermost edge. The inclined seat 37 is adapted to receive the inturned edge or bead of the inner tire rim 39 for demountable mounting on the wheel.

The outboard side of the rim mounting band 33 is likewise formed with an integral annular inclined portion 40 merging into a cylindrical seat 41 which is adapted to receive the inturned edge 42 of the outer tire rim 43, this rim being preferably a duplicate of the inner rim 39 but oppositely mounted on the vehicle wheel. The outer edge 44 of seat 41 is preferably inwardly radially turned to make easier the mounting of rims 39 and 43.

Means for removably securing rims 39 and 43 in place on the wheel include a plurality of circumferentially spaced lug supporting members 45, as shown in Fig. 2, which are U-shaped webs with their open tops directed radially outwardly of the wheel. The rear, or axially inward, edge of the web of each lug support 45 abuts the radially outer turned portion or rib 24 of web 22 and is securely welded thereto by an arcuate weld 46, and the forward edges of the support are bevelled, as designated by the numeral 47 in Fig. 2, to fit under the turned edge 44 of the rim band 22. There are thus provided a plurality of seats for the lugs 50, which engage the outer inclined surface of bead 42 of outer rim 43. A spacer ring 51 is positioned between the dual rims engaging the beads thereof to space the rims and securely wedge the inner rim in place upon seat 37. Lug bolts 53 are positioned in suitable apertures provided through portions 35 and 40 of rim mounting band 33 at places axially alined with the centers of lug supports 45. The inclined portions 35 and 40 are inclined at a somewhat greater angle to the axis of the wheel at the bolt apertures, and bolt 53 is provided with a flat side on its head to engage rim band portion 36 to prevent turning. Nuts 54 on the ends of bolts 53 maintain lugs 50 in place to securely assemble the rims 39 and 43 on the wheel and allow easy removal thereof.

As shown in detail in Fig. 3 of the drawings, the outwardly radially extending arm portions of the rim band 33 may be interrupted for a short distance at a place in their circumference in order to accommodate a valve stem for the inner tire.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a hub, a single radially extending annular web member turned at its inner periphery to provide an internal cylindrical seat to receive said hub and secured thereto and turned at its outer periphery to provide an external cylindrical seat, a dual rim mounting band seated on said external seat and secured thereto, said band being of relatively deep central channel formation and having a pair of substantially outwardly radially and substantially axially oppositely extending annular supporting portions, each said portion having a seat to receive a tire rim and means for demountably mounting a rim on each of said seats.

2. A vehicle wheel comprising, in combination, a radially extending web member, a dual rim mounting band secured to the outer periphery of said member, said band having a pair of substantially outwardly radially and substantially axially oppositely extending annular supporting portions, each said portion having a seat to receive a tire rim, and means for removably mounting a rim on each said seat, said means including a plurality of axially extending lug supports secured to said web member.

3. A vehicle wheel comprising, in combination, a radially extending web member, a dual rim mounting band secured to the outer periphery of said member, said band having a pair of substantially outwardly radially and substantially axially oppositely extending annular supporting portions, each said portion having a seat to receive a tire rim, and means for removably mounting a rim on each said seat, said means including a plurality of axially extending and circumferentially spaced lug supports abutting said web member and one of said rim mounting band portions.

4. A vehicle wheel comprising, in combination, a radially extending web member, a dual rim mounting band secured to the outer periphery of said member, said band having a pair of substantially outwardly radially and substantially axially oppositely extending annular supporting portions, each said portion having a seat to receive a tire rim, and means for removably mounting a rim on each said seat, said means including a plurality of axially extending and circumferentially spaced lug supporting webs of substantially U cross section positioned with their open tops adjacent an inner cylindrical surface of one of said rim band portions and a lateral edge abutting said web member.

5. A vehicle wheel comprising, in combination, a hub, a single radially extending web member having a substantially S configuration in radial cross section providing an inner cylindrical portion seated on and secured to said hub and an outer cylindrical portion, a dual rim mounting band seated on and secured to said outer cylindrical portion, said band being of relatively deep central channel formation and having a pair of outwardly radially and axially oppositely extending annular portions the inner of said portions having an inclined rim seating surface and the outer of said portions having a cylindrical rim seating surface, and means for demountably mounting a rim on each of said surfaces.

CHARLES S. ASH.

REFERENCES CITED

The following references are of record in the file of this patent:

UNITED STATES PATENTS

| Number | Name | Date |
|---|---|---|
| 1,539,065 | Williams | May 26, 1925 |
| 1,559,538 | Alderfer | Nov. 3, 1925 |
| 1,679,892 | Bretaud | Aug. 7, 1928 |
| 1,715,610 | Lofland | June 4, 1929 |
| 1,769,296 | Klaus | July 1, 1930 |
| 2,084,077 | Brunner | June 15, 1937 |
| 2,334,673 | Hawthorne | Nov. 16, 1943 |